United States Patent Office 3,676,201
Patented July 11, 1972

3,676,201
ADHESIVE COATED VINYL CHLORIDE FILM
Richard C. Doss and Faber B. Jones, Bartlesville, Okla., assignors to Phillips Petroleum Company
No Drawing. Filed Jan. 8, 1970, Ser. No. 1,537
Int. Cl. C09j 7/02
U.S. Cl. 117—122 H   3 Claims

ABSTRACT OF THE DISCLOSURE

Film materials of vinyl chloride polymers are contacted with a dry-film forming, heat-activatable solution of adhesive material comprising the reaction product of an essentially linear essentially dihydroxy polyester and a diisocyanate.

BACKGROUND OF THE INVENTION

Sheet and film products of polymers of vinyl chloride, such as polyvinyl chloride (PVC), have enjoyed wide use in various industries in the formation of a variety of laminated structures. It is well known that in order to form a durable laminate the film and substrate must be firmly bonded with a suitable adhesive material. Such adhesive materials are, of course, commercially available, but their use in industry presents certain problems which render the adhesive materials especially inconvenient in application.

A number of the known adhesive materials which do develop adequate strength characteristics suitable for laminating, inherently require that the lamination step be undertaken while the adhesive is wet. The requirement that these adhesive materials be wet at the time of lamination in order to develop adhesive properties presents several problems to the user. In brief, these problems revolve about the basic requirement that preparation of the adhesive material, application of it to the film or substrate, and lamination of the film and substrate must be conducted in immediate succession. This basic requirement presents the additional problem of handling wet films in commercial quantities. There is also presented the the problem of timing, in that there cannot be untimely delay involved in the various handling steps between preparing and applying the adhesive material and laminating the film and substrate. It is obvious, of course, that the requirement for wet application of the adhesive material virtually precludes the user from storing, for example, an inventory of adhesive coated film for laminanation at some future time.

When the substrate is flat the process of laminating under wet conditions, while being difficult as above described, is not nearly so difficult as when the substrate has a highly contoured surface. It is axiomatic that film and substrate must be in firm contact in all places where a durable laminate is desired in order for the adhesive material to perform as designed. Where the substrate is flat the requisite firm contact can be conveniently achieved by, for example, the direct application of pressure such as by pressure rolls or a press and the like. However, where the substrate is not flat, but instead curved or highly contoured the direct application of pressure is not convenient. Accordingly, a special bonding process, vacuum form bonding, has developed in the art to facilitate the lamination of contoured substrates with, for example, vinyl chloride based film products. Vacuum form bonding does provide a technique for developing the necessary firm contact. In brief, the process of vacuum form bonding involves heating the film to a temperature at which the film softens, then applying the softened film to the substrate by means of a low pressure established between the film and the substrate. The low pressure creates a pressure drop across the film which, due to its softened condition, the film cannot resist, and it is, therefore, driven against the surface of the substrate to thereby establish the necessary firm contact. The problems associated with vacuum form bonding are compounded when the adhesive material must be handled wet, and they are further compounded when the surface of the substrate is highly contoured.

In view of the problems discussed above it would be highly desirable, especially from a manufacturing point of view, to have an adhesive system which would enable application of an adhesive material in liquid form to a film which could, after drying, be stored at ordinary warehouse conditions and then, after a period of storage, be removed from storage, be handled dry preparatory to vacuum form bonding, and then be heat activated during the heating step of the vacuum forming and still form a durable laminate. Such a dry-coated film would be highly useful in that it would enable a manufacturer to retain an inventory of adhesive-backed film of perhaps various designs and colors for a period of time prior to lamination. Such a film would lend a flexibility to film laminating not heretofore known. The requirements of such an adhesive system would be that the adhesive be easily applied by conventional liquid applicators, quickly dried, readily stored under warehouse conditions without loss of adhesive properties and without sticking to undesired surfaces, conveniently handled, easily bonded to flat and contoured substrates by conventional means, and sufficiently strong to resist the processing strains present prior to during, and subsequent to lamination.

THE INVENTION

It is thus an object of this invention to provide a novel adhesive material for vinyl chloride polymers.

Another object of this invention is to provide a novel vinyl chloride adhesive film particularly suitable for vacuum form bonding.

A further object of this invention is to provide a laminated article having an improved adhesive system therein.

A still further object of this invention is to provide a process for bonding a film of vinyl chloride polymer to a substrate.

Other aspects, objects, and the several advantages of this invention will be apparent to one skilled in the art from the following disclosure, examples and claims.

We have discovered that a novel adhesive material is produced when an essentially linear essentially dihydroxy polyester is mixed with a diisocyanate in such proportions that the initial charges of polyester diol and diisocyanate provide a ratio of hydroxyl groups to isocyanate groups in the range of about 0.9:1 to 20:1 and preferably in the range of about 1:1 to 5:1. When this adhesive material is dissolved in a suitable solvent, the resulting adhesive solution or dispersion applied to one side of a film material, and the solution-wet film allowed to form a dry coating on one side of the film there is produced a dry, storable, heat activatable adhesive film. The dry coating, being the adhesive material, is the reaction product of the above-mentioned polyester diol and diisocyanate.

Regarding the adhesive material itself, the term "essentially linear essentially dihydroxy polyester" utilized herein is intended to mean the dihydroxy polyesters in which the crosslink density is minimized; such polyesters can be prepared by the condensation of at least one dihydric alcohol, generally a saturated aliphatic diol, with at least one dicarboxylic acid or anhydride, generally a saturated dicarboxylic acid or anhydride or one which contains only benzenoid unsaturation.

When preparing these polyester diols, an excess of diol over dicarboxylic acid is generally used to insure that the resulting essentially linear polyester chains contain a sufficient amount of reactive hydroxyl groups.

The essentially linear essentially dihydroxy polyesters used in preparing the adhesive material preferably have molecular weights ranging from 750 to about 15,000. In addition they will generally have relatively low acid numbers, e.g., acid numbers not appreciably in excess of about 60 and preferably as low as can be practicably obtained, e.g. 2 or less. Correspondingly, they will generally have relatively high hydroxyl numbers, e.g., from about 30 to about 700.

Examples of some dihydric alcohols useful herein include ethylene glycol, 1,2-propanediol, 1,3-propanediol, 1,3-butanediol, 1,4-butanediol, 1,2-pentanediol, 1,5-pentanediol, 1,3-hexanediol, 1,6-hexanediol, diethylene glycol, dipropylene glycol, triethylene glycol, tetraethylene glycol, di(1,4-butylene glycol), tri(1,4-butylene glycol, and poly (1,4-butylene glycol), and the like, as well as mixtures of such diols with each other. Minor amounts of polyols having more than two hydroxyl groups can be tolerated in mixture with the diols, but it is preferred that polyols having more than two hydroxyl groups not be present. If such polyols are present it is preferred that they be limited to saturated aliphatic polyols such as glycerol, trimethylol ethane, trimethylol propane, pentaerythritol, sorbitol, and the like.

Dicarboxylic acids and anhydrides useful herein include oxalic, malonic, phthalic, terephthalic, isophthalic, glutaric, adipic, pimelic, suberic, azelaic, sebacic, malic, cyclohexanedicarboxylic, and endomethylenetetrahydrophthalic acids, and the like and their isomers, anhydrides, homologs, and other substituted derivatives, e.g., chloro derivatives, or mixtures of such acids or anhydrides with each other. Minor amounts of polycarboxylic acids containing three or more carboxyl groups can be tolerated in mixture with the dicarboxylic acids, but it is preferred that polycarboxylic acids having more than two carboxyl groups not be present. It is preferred that the essentially linear essentially dihydroxy polyester be a polyester diol having a molecular weight of approximately 5500 prepared by the condensaiton of 1,4-butanediol with a mixture comprising terephthalic acid, isophthalic acid, and sebacic acid in a molar ratio of 1 to 2 to 1.

With further regard to the adhesive material itself, the term "diisocyanate" is intended to include mixtures of various aromatic and aliphatic, including cycloaliphatic, diisocyanates together with not more than minor amounts of triisocyanates, tetraisocyanates, and the like; however, it is preferred that tri- and higher isocyanates not be present at all.

Examples of aromatic, aliphatic, and cycloaliphatic, dioscyanates useful herein include m-phenylenediisocyanate, p-phenylenediisocyanate, 4-t-butyl-m - phenylenediisocyanate, 4-methoxy-m-phenylenediisocyanate, 4-phenoxy-m-phenylenediisocyanate, 4-chloro-m-phenylenediisocyanate, toluenediisocyanates (either as a mixture of isomers, e.g., the commercially available mixture of 80 percent by weight 2,4-toluenediisocyanate and 20 percent by weight 2,6-toluenediisocyanate, or as the individual isomers themselves), m-xylylenediisocyanate, p-xylylenediisocyanate, cumene-2,4-diisocyanate, durenediisocyanate, 1,4-naphthylenediisocyanate, 1,5-naphthylenediisocyanate, 1,8-naphthylenediisocyanate, 2,6 - naphthylenediisocyanate, 1,5-tetrahydronaphthylenediisocyanate, p,p'-diphenyldiisocyanate, diphenylmethane-4,4' - diisocyanate, 2,4 - diphenylhexane-1,6-diisocyanate, "bitolylenediisocyanate," (3,3'-dimethyl - 4,4' - biphenylenediisocyanate), "dianisidinediisocyanate" (3,3'-dimethoxy - 4,4' - biphenylenediisocyanate), methylenediisocyanate, ethylenediisocyanate, the tri-, tetra-, penta-, hexa-, hepta-, octa-, nona-, and decamethylene-w,w'-diisocyanates, 2-chlorotrimethylenediisocyanate, 2,3 - dimethyltetramethylenediisocyanate, 1,3-cyclopentylenediisocyanate, 1,4-cyclohexylenediisocyanate, and diisocyanates derived from dimerized linoleic acid, and the like.

The preferred diisocyanate to be reacted with the above referred to preferred polyester diol is 2,4-toluenediisocyanate. As previously mentioned, the quantities of polyester diol and diisocyanate initially charged to form the adhesive material itself is depedent upon the quantities sufficient to provide a ratio of hydroxyl groups to isocyanate groups in the range of about 0.9:1 to 20:1; therefore, if the adhesive material is made from the above mentioned preferred ingredients, then the hydroxy to isocyanate ratios within the above range will result if 96.5 to 99.8 weight percent of the adhesive material is the above preferred polyester diol having a molecular weight of approximately 5500 and the remaining 3.5 to 0.2 weight percent is 2,4-toluenediisocyanate.

Solvents or dispersing media useful herein can be, e.g., any of the following hydrocarbons such as benzene, toluene, xylene, hexane, octane, naphtha, cyclohexane, and methylcyclopentane; chlorinated hydrocarbons such as methylene chloride, chloroform, carbon tetrachloride, ethylene chloride, trichloroethylene, and propyl chloride; ketones such as acetone, methyl ethyl ketone, methyl isobutyl ketone, and cyclohexanone; ethers such as diethyl ether, dipropyl ether, dibutyl ether, tetrahydrofuran, dioxane, and dimethyl ether of ethylene glycol; esters such as ethyl acetate, butyl acetate, and 2-ethoxyethyl acetate; and nitriles such as acetonitrile and propionitrile. The solvent or dispersing media should be used in an amount sufficient to permit convenient application of the liquid adhesive composition to the film.

When preparing the adhesive solution it is preferred that 65 to 75 percent by weight of the solution or dispersion be solvent and that the remaining 25 to 35 percent by weight be the above described adhesive material.

The preferred solvent is a combination consisting of about 42 percent by weight methylene chloride, about 26 percent by weight methyl ethyl ketone, and about 32 percent by weight toluene.

The viscosity of the adhesive solution increases with time from an initial value of about 600 centipoise to about 3000 centipoise after about 3 days. Accordingly, it is preferred that freshly prepared adhesive solutions should be applied to the film material in continuous plant coating operations.

The solution or dispersion is most conveniently applied to the film material at ambient temperature by any type of method known in the art which can be adjusted to provide a 2 to 3 mil dry film adhesive. The solvent or dispersing medium must be removed prior to storage of the adhesive film. This can be accomplished by evaporation, preferably through the application of heat for 5 to 10 minutes at 135° to 160° F.

The produced dry-coated adhesive film can be stored for a period of at least 22 days at 50–110° F. and thereafter the adhesive material can be heat activated and the film can be laminated to highly contoured surfaces by vacuum form bonding. The adhesive film, subsequent to drying which involves complete evaporation of the solvent, is not tacky at temperatures of 50–110° F; it has substantial retention of peel strength and creep resistance after storage for periods of at least 22 days; and it exhibits only a slight blocking tendency after conditioning at 104° F. for 24 hours.

The film material which can be used herein includes, in addition to polyvinyl chloride, copolymers of vinyl chloride with other monomers such as vinyl acetate, maleates, fumarates, crotonates, acrylates, methacrylates, ethylene, propylene, and the like, wherein at least 50 percent by weight of the copolymer is derived from vinyl chloride. The thickness of the film material is not critical to the present invention and any convenient film thickness can be employed.

The dry, adhesive-coated, film material, the dry adhesive on which is capable of being heat activated, can be bonded to a variety of substrate materials such as particle board, aluminum, carbon steel, plywood and asbestos by the application of heat to produce a film temperature in the range of 150° to 450° F., preferably 200° to 350° F., and by the application of a pressure drop between the adhesive film and the substrate. The pressure drop can be achieved by the direct application of pressure to the film such as by rolls and the like in which case the differential across the film can be in the range of about 0.2 p.s.i. to 100 p.s.i. and preferably about 10 p.s.i. Where direct pressure is used the film temperature is preferably in the range from about 200 to 330° F. The pressure drop can also be achieved by vacuum forming in which case a negative pressure is induced between the film material and the substrate. In such a situation the pressure differential across the film is, of course, limited to local ambient pressure, however, an absolute pressure in the range from about 1.0 to 12.0 p.s.i.a. induced between the film material and substrate is sufficient to provide good film to substrate contact. This absolute pressure range is equivalent to a differential pressure range across the film of about 13.7 to 2.7 p.s.i. assuming standard atmospheric pressure. Where vacuum forming is used the film temperature is preferably in the range from about 250 to 350° F.

EXAMPLES

In this specification and especially in the examples and recorded results which appear hereafter there are mentioned various words, phrases, test procedures, and the like which have specific meaning in the art. However, to avoid confusion and to promote understanding the following definitions and descriptions of certain words and phrases of art and of certain test procedures are given. These definitions and descriptions shall control the meaning of the words, phrases and procedures used in this specification wherever they may appear.

Vacuum-form bonding: In the art of laminating a film, such as polyvinyl chloride and the like, to a surface (substrate) it is essential to a good bond that there be a firm contact established between the film and the substrate so that the adhesive material employed can perform as designed. When the substrate is not a flat surface, but is instead a contoured surface, a special bonding process is used because an adhesive backed film cannot be conveniently rolled on the surface to establish the essential firm contact between film and substrate. Accordingly, by the process of vacuum-form bonding the film is heated to a certain softening point at which time a negative pressure is established between the film and substrate which causes the film to be drawn onto the contoured surface. In general the more intricate the contoured surface, the hotter the film must be during the process in order to conform to the surface. Since a bonded film is under greater internal strain when the substrate is contoured than when the substrate is flat, the requirements of an adhesive material used in vacuum-form bonding to contoured surfaces are more demanding than in flat surface laminating.

Peel strength: A measure of the bond produced by an adhesive material between a flexible film and a substrate is expressed, in general terms, as the force required to strip or peel the adhering film from the substrate. This force, called peel strength, is reported as the average load in pounds (force) per unit width in inches of bond line, i.e., pounds per inch of width (p.p.i.w.), required to progressively separate the adhering film from the substrate at a separation angle of approximately 180° and at a separation rate of six inches per minute. The procedure employed for determining peel strength is fully set out in ASTM Standard Method of Test designated D903–49 and this method was used except for such changes as may hereinafter become apparent.

All samples prepared herein for determination of peel strength were prepared according to the following basic procedure: Each peel strength test specimen comprised a 1-inch wide by 10-inch long piece of polyvinyl chloride woodgrain film bonded to a 1-inch wide by 8-inch long by ¾-inch thick piece of flat particle board substrate, such that 5 inches of film were bonded to the particle board thus leaving 3 inches of board and 5 inches of film free for clamping in the test apparatus. All peel strength specimens were prepared in groups of four as follows.

A solution of a given amount of adhesive mixture in a given amount of solvent was spread over the center portion of the backside of a 12.0 inch by 12.0 inch by 0.008 inch flat sample of polyvinyl chloride woodgrain film. The solution was evenly spread to a uniform thickness of approximately 3.64 mils and it covered an area of approximately 8.0 inches by 10.0 inches. The solution wet film was then placed in a forced-air oven maintained at approximately 158° F. for a sufficient length of time to evaporate the solvent and thus leave a dry coating comprising the adhesive mixture affixed to the backside of the film. The solvent evaporation time consumed 5 to 10 minutes. Since the object of the experimentation was to produce a dry, storable, heat activatable film which would retain satisfactory adhesive characteristics after a period of storage at ambient temperature, the above described dry coated film immediately after solvent removal was placed in storage at 75° F. for a given period of time prior to the bonding step.

After the given storage (conditioning) period the film was vacuum-form bonded to an 8.0 inch by 5.0 inch by 0.75 inch piece of flat particle board as follows.

The dry coated 12.0 inch by 12.0 inch film was clamped in a 12.0 inch by 12.0 inch frame. The framed film was then placed over the open top of a 12.0 inch by 12.0 inch by 5.0 inch box with the coated side of the film facing the interior of the box. The box contained the above mentioned particle board which was lying in the bottom of the box and placed opposite the coated side of the framed film which was secured to the open top of the box. The box also contained a small outlet in one side, which was connected by suitable means to the suction side of a vacuum pump which was used to create a negative pressure with respect to ambient of about 1–10 p.s.i.a. within the box to thus facilitate the subsequent draw-down of the heat softened/activated film over the surface of the particle board. A heater was positioned approximately 5.0 inches above the film in such a manner that it could be removed at will. The heater was an integral part of a vacuum forming unit (Auto-Vac, Vacuum Forming Machine, Model LV). A piece of 32-ounce cotton duck cloth (12.0 inches by 12.0 inches by 0.080 inch) and a doubled piece (12.0 inches by 12.0 inches) of 17 mesh stainless steel screen were placed immediately over the film to moderate the intense heat emitted by the heater. Heat was applied to this complete assembly for approximately 2½ minutes and the film was heated to a temperature in the range of about 300–325° F. before vacuum was applied. The heat was continued for about 10–15 seconds after the vacuum was first applied. The vacuum drawdown was then continued for about 30–45 seconds after heating was ceased to thus produce a total time of vacuum application in the range of about 40 to 60 seconds. The vacuum was then released and thereafter cool air was passed over the laminated surface to reduce the film temperature to ambient (75° F.).

The laminated assembly was then stored (conditioned) for a full day (24 hours) at 75° F. before further experimentation was undertaken. At the end of this conditioning period the above described peel strength test specimens were prepared from the above described laminated assembly. As previously mentioned, four test specimens of the specified dimensions were prepared from the laminated assembly and all four were subjected to peel strength tests at approximately 75° F. on an Instron Model TT at a crosshead speed of 12 inches per minute. The reported peel strength for the laminated assembly is the average peel strength of the four test specimens prepared from the assembly.

Creep resistance: Another measure of the bond strength of an adhesive material is its ability to resist alteration in bonded dimensions as a result of various factors, two of which include temperature and time. When polyvinyl chloride film is bonded to a substrate and especially to those having a highly contoured surface, considerable strain is introduced into the film. As the laminated assembly (film-adhesive-substrate) is subjected to environmental temperature, e.g., 50 to 158° F., the bonded film tends to relax. The tendency to relax, that is, the elastic memory, increases with temperature so that more bonding strength, creep resistance, is required from the adhesive system in order to overcome this internal elastic stress.

It is interesting to note that when the adhesive backed polyvinyl chloride film is heated above about 350° F. it loses its elastic memory which means that the strength properties (creep resistance) of the adhesive material can be reduced if the film is heat activated above about 350° F. However, since the test specimens employed herein involved woodgrain polyvinyl chloride the heat activation temperatures were limited to film temperatures of 275–325° F. This temperature limitation is based solely on the fact that above 350° F. the matte finish of the polyvinyl chloride film glazes and loses its woodgrain appearance. The temperature limitation does not limit the adhesive activation temperature which can be in excess of 350° F. and up to 450° F.

Creep resistance measurements herein were made as follows: A 12.0 inch by 12.0 inch by 0.008 inch sample of polyvinyl chloride woodgrain film was dry coated with adhesive material in preparation for vacuum forming in exactly the same manner as described above under the discussion pertaining to peel strength.

After a storage (conditioning) period of one day (24 hours) the film was vacuum-form bonded to a substrate utilizing a vacuum forming procedure similar to that described above under the discussion pertaining to peel strength. Actually the only difference between the two procedures was in the configuration of the substrate. In order to test for creep resistance a special particle board was designed to represent the most severe contours expected to be encountered in commercial vacuum-form bonding operations. This special substrate was 5⅝ inches long by 5.0 inches wide by 1.0 inch thick having a flat bottom and a "waffle-like" top surface. As the "waffle-like" description suggests, the top surface was crisscrossed with V notches. There were five different type notches, each differing from the other by its particular combination of notch depth and notch angle. The top edge of the entire periphery of the substrate was chamfered at a 45° angle. The chamfer extended to a depth of ¼ inch beneath the top surface of the substrate. Perpendicular to the length dimension and running from one side to the other side parallel to the width dimension were three notches; also perpendicular to the width dimension and running from one side to the other side parallel to the length dimension were three more notches. This combination of chamfers and intersecting notches thus produced a top surface plane consisting of 16 rectangular flat surfaces of varying dimensions each one surrounded by nonperpendicular sides. Spaced holes 0.04 inch in diameter were drilled in the bottom of the notches in order to assist the draw-down during vacuum forming.

Subsequent to vacuum-form bonding the film to the special substrate, the laminated assembly was stored for 24 hours at 75° F. After the storage period the laminated assembly was then placed in an oven maintained at 158° F. If the film continued to be completely bonded to the notches for a period of 10 days at the 158° F. temperature, the creep resistance of the adhesive mixture was considered "good." If the film lifted from the notches within 24 hours at the 158° F. temperature, the creep resistance of the adhesive mixture was considered "poor."

Blocking: As defined herein the term "blocking" is intended to mean the adhesion between touching layers of material such as occurs under moderate pressures during storage or use wherein one touching face is an adhesive material and the face touched is a nonadhesive material.

Specimens employed herein for use in the blocking test were prepared as follows. Six test specimens, each one being 1.5 inches by 1.5 inches by 0.008 inch were cut from a suitably large sample of adhesive coated polyvinyl chloride woodgrain film. The sample of film was adhesive coated in exactly the manner described above in the discussion pertaining to peel strength. The prepared film was conditioned at 75° F. for 24 hours following the solvent removal step. After conditioning the above mentioned six test specimens were cut from the film. The six test specimens were divided into three groups of two. The two specimens in each group were stacked such that the adhesive face on each one faced down (the adhesive faces did not touch). Each of the three groups of stacked specimens were placed, adhesive face down, on a steel plate, each plate being 1.5 inches by 1.5 inches, the specimens and plates were aligned so that the edges were flush and a 1 pound weight having a flat base 1 square inch in area was placed on each one of the specimen stacks. The prepared specimens were transferred to an oven maintained at 104° F. and conditioned at that temperature for a period of 24 hours. At the end of the period the test specimens were separated. If the test specimens could be separated without sticking to one another, the adhesive was considered to have "no blocking tendency." If the test specimens did stick together but could be separated without any transfer or damage to either surface the adhesive was considered to have a "slight blocking tendency." If the test specimens did stick together and could not be separated without damage to either surface or transfer of the adhesive from one surface to the other the adhesive was considered to have a "severe blocking tendency."

An adhesive meriting a given blocking tendency rating after the 24 hour conditioning at 104° F. will not exhibit a further blocking tendency if the period of storage is greater than 24 hours. This is especially true where the longer period of storage is at temperatures below 104° F.

EXAMPLE I (a) Four peel strength test specimens were prepared, tested, and reported according to the above described procedure pertaining to Peel Strength wherein 30 gms. of the polyester diol having a molecular weight of approximately 5500 prepared by the condensation of 1,4-butanediol with a mixture of terephthalic acid, isophthalic acid, and sebacic acid in a molar ratio of 1:2:1 were reacted with 1 gm. of 2,4-toluene-diisocyanate in the presence of 70 gms. of a solvent mixture consisting of methylene chloride, toluene, and methyl ethyl ketone in weight percent proportions of 42, 32, and 26 respectively. Prior to vacuum-form bonding the adhesive coated film was conditioned for 1 day at 75° F.

(b) Utilizing the same ingredients in the same quantities as mentioned in (a) above a creep resistance sample was prepared, tested and reported in accordance with the above described procedure pertaining to Creep Resistance.

(c) Utilizing the same ingredients in the same quantities as mentioned in (a) above, six test specimens for the determination of Blocking were prepared, tested and reported in accordance with the above described procedure pertaining to Blocking.

EXAMPLE II (a) Four peel strength test specimens were prepared, tested, and reported according to the above described procedure pertaining to Peel Strength wherein 45 gms. of the polyester diol of Example I(a) were reacted with 1 gm. of 2,4-toluenediisocyanate in the presence of 105 gms. of the solvent of Example I(a).

(b) Utilizing the same ingredients in the same quantities as mentioned in (a) above a creep resistance sample was prepared, tested and reported in accordance with the above described procedure pertaining to Creep Resistance.

(c) Utilizing the same ingredients in the same quantities as mentioned in (a) above, six test specimens for the determination of blocking were prepared, tested and reported in accordance with the above described procedure pertaining to Blocking.

EXAMPLE III (a) Four peel strength test specimens were prepared, tested and reported according to the above described procedure pertaining to Peel Strength wherein 60 gms. of the polyester diol of Example I(a) were reacted with 1 gm. of 2,4-toluenediisocyanate in the presence of 140 gms. of the solvent of Example I(a).

(b) Utilizing the same ingredients in the same quantities as mentioned in (a) above a creep resistance sample was prepared, tested and reported in accordance with the above described procedure pertaining to Creep Resistance.

(c) Utilizing the same ingredients in the same quantities as mentioned in (a) above, six test specimens for the determination of Blocking were prepared, tested and reported in accordance with the above described procedure pertaining to Blocking.

EXAMPLE IV (a) Four peel strength test specimens were prepared, tested and reported according to the above described procedure pertaining to Peel Strength wherein 100 gms. of the polyester diol of Example I(a) were reacted with 1 gm. of 2,4-toluenediisocyanate in the presence of 233 gms. of the solvent of Example I(a).

(b) Utilizing the same ingredients in the same quantities as mentioned in (a) above a creep resistance sample was prepared, tested and reported in accordance with the above described procedure pertaining to Creep Resistance.

(c) Utilizing the same ingredients in the same quantities as mentioned in (a) above, six test specimens for the determination of Blocking were prepared, tested and reported in accordance with the above described procedure pertaining to Blocking.

The results of experiments 1–4 are shown in Table 1 as follows:

EXAMPLE V (a) Four peel strength test specimens were prepared, tested, and reported exactly as in Example I(a).

(b) Same as 5(a) except there was a 10-day conditioning period.

(c) Same as 5(a) except there was a 22-day conditioning period.

EXAMPLE VI (a) Four peel strength test specimens were prepared, tested and reported exactly as in Example II(a).

(b) Same as 6(a) except there was 10-day conditioning period.

(c) Same as 6(a) except there was a 22-day conditioning period.

EXAMPLE VII (a) Four peel strength test specimens were prepared, tested, and reported exactly as in Example III(a).

(b) Same as 7(a) except there was a 10-day conditioning period.

(c) Same as 7(a) except there was a 22-day conditioning period.

EXAMPLE VIII (a) Four peel strength test specimens were prepared, tested and reported exactly as in Example IV(a).

(b) Same as 8(a) except there was a 10-day conditioning period.

(c) Same as 8(a) except there was a 22-day conditioning period.

The results of experiments 5–8 are shown in Table 2 as follows:

TABLE 2.—PEEL STRENGTH OF ADHESIVE MATERIAL [1] AFTER PERIOD OF STORAGE OF DRY COATED FILM PRIOR TO VACUUM FORM BONDING

| | Composition of adhesive material | | Peel strength, lb./in.—width | | |
| --- | --- | --- | --- | --- | --- |
| Ex. No. | Weight ratio, gms. polyester diol/gm. diisocyanate | Hydroxyl to isocyanate, ratio OH/NCO | 1 day storage | 10 days storage | 22 days storage |
| 5 | 30:1 | 0.95/1.0 | 3.0 | <1.0 | |
| 6 | 45:1 | 1.42/1.0 | 4.0 | | <1.0 |
| 7 | 60:1 | 1.89/1.0 | 4.5 | 3.0 | <1.0 |
| 8 | 100:1 | 3.16/1.0 | 4.2 | 3.5 | 3.0 |

[1] The adhesive material comprised the reaction product of 2,4-toluenediisocyanate with the polyester diol prepared by the condensation of 1,4-butanediol with a mixture of terephthalic acid, isophthalic acid, and sebacic acid in a molar ratio of 1:2:1.

Reasonable variations and modifications, which will be apparent to those skilled in the art, can be made in this invention without departing from the spirit or scope thereof.

We claim:

1. A dry, storable, heat-activatable, adhesive-coated film comprising an adhesive material in combination with a vinyl chloride-based polymer film material wherein said adhesive material is affixed to one side of said film material in the form of a dry coating, said dry coating being

TABLE 1.—PERFORMANCE PROPERTIES OF ADHESIVE MATERIAL [1]

| | Composition of adhesive material | | Vacuum form bond properties [2] | | | | Storage |
| --- | --- | --- | --- | --- | --- | --- | --- |
| Ex. No. | Weight ratio, gms. polyester diol/gm. diisocyanate | Hydroxyl to isocyanate, ratio OH/NCO | Peel strength,[3] lb./in.—width | Creep resistance,[3] 10 days at 158° F. | Adhesive state | Activation temp., °F. | properties blocking,[4] 1 day at 104° F. |
| 1 | 30:1 | 0.95/1.0 | 3.0 | Fair | Dry on film | 275–325 | Slight. |
| 2 | 45:1 | 1.42/1.0 | 4.0 | Good | do | 275–325 | Do. |
| 3 | 60:1 | 1.89/1.0 | 4.5 | do | do | 275–325 | Do. |
| 4 | 100:1 | 3.16/1.0 | 4.2 | do | do | 275–325 | Do. |

[1] The adhesive material comprised the reaction product of 2,4-toluenediisocyanate with the polyester diol prepared by the condensation of 1,4-butanediol with a mixture of terephthalic acid, isophthalic acid, and sebacic acid, in a molar ratio of 1:2:1.
[2] Vacuum form properties were determined by experimenting with polyvinyl chloride woodgrain film bonded to flat (peel strength, and contoured (creep resistance) particle board.
[3] Prior to vacuum forming the dry coated film was conditioned at 75° F. for 1 day.
[4] Prior to stacking the test specimens were conditioned at 75° F. for 1 day.

the product of the reaction between an essentially linear essentially dihydroxy polyester and a diisocyanate, said polyester and said diisocyanate being initially charged to said reaction in sufficient quantity such that the ratio of hydroxyl groups to isocyanate groups is in the range of about 0.9:1 to 20:1; the adhesive nature of said adhesive film being heat activated with substantial retention of peel strength and creep resistance characteristics even after storage for a period of up to 22 days or more subsequent to application of said adhesive material to said film material, and wherein said essentially linear essentially dihydroxy polyester is a polyester diol having a molecular weight of approximately 5500 prepared by the condensation of 1,4-butanediol with a mixture of terephthalic acid, isophthalic acid, and sebacic acid, and wherein said diisocyanate is 2,4-toluenediisocyanate; said polyester diol and said diisocyanate being initially present in sufficient quantities such that said ratio of hydroxyl groups to isocyanate groups is in the range of about 1:1 to 5:1.

2. The adhesive film of claim 1 wherein said vinyl chloride-based polymer contains vinyl chloride in the range from about 50 to 100 percent by weight of said polymer.

3. The adhesive film of claim 1 wherein said film material is polyvinyl chloride.

References Cited
UNITED STATES PATENTS

| | | | |
|---|---|---|---|
| 3,310,533 | 3/1967 | McElroy | 117—161 X |
| 3,532,533 | 10/1970 | Ackerman | 117—122 X |

WILLIAM D. MARTIN, Primary Examiner

B. D. PIANALTO, Assistant Examiner

U.S. Cl. X.R.

117—161 KP